United States Patent
Paczkowski et al.

(10) Patent No.: US 9,392,442 B1
(45) Date of Patent: Jul. 12, 2016

(54) SECURED APPLICATION COMMUNICATIONS

(71) Applicant: Sprint Communications Company L.P., Overland Park, KS (US)

(72) Inventors: Lyle Walter Paczkowski, Mission Hills, KS (US); David A. Hufker, Shawnee, KS (US); Michael David Svoren, Jr., Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 254 days.

(21) Appl. No.: 14/037,637

(22) Filed: Sep. 26, 2013

(51) Int. Cl.
*H04L 9/12* (2006.01)
*H04W 12/02* (2009.01)
*H04L 12/24* (2006.01)

(52) U.S. Cl.
CPC ............ *H04W 12/02* (2013.01); *H04L 9/12* (2013.01); *H04L 12/2426* (2013.01); *H04L 41/0806* (2013.01)

(58) Field of Classification Search
CPC ..... H04W 12/02; H04L 9/12; H04L 12/2426; H04L 41/0806
USPC ............................................ 726/26; 380/249
See application file for complete search history.

(56) References Cited

U.S. PATENT DOCUMENTS

| | | | |
|---|---|---|---|
| 7,542,728 B2 | 6/2009 | Bitran et al. | |
| 7,567,820 B2 | 7/2009 | Bitran et al. | |
| 8,099,127 B2 | 1/2012 | Narathong et al. | |
| 8,294,515 B1 | 10/2012 | Riekki et al. | |
| 2005/0239497 A1* | 10/2005 | Bahl | H04W 88/06 455/552.1 |
| 2006/0224707 A1* | 10/2006 | Kawai et al. | 709/220 |
| 2008/0011833 A1* | 1/2008 | Saarisalo | G06Q 20/32 235/382 |
| 2013/0039271 A1 | 2/2013 | de la Garrigue | |
| 2013/0039287 A1* | 2/2013 | Rayavarapu | H04W 76/048 370/329 |

* cited by examiner

*Primary Examiner* — Ellen Tran

(57) ABSTRACT

Examples disclosed herein provide systems, methods, and software for initiating communication for a secured application. In one example, a method for initiating communication on a wireless communication device includes identifying a communication request for a secured application and selecting one or more radio transceivers for the communication request. The method further provides initializing the one or more radio transceivers to search for availability data based on an open operating system command and identifying an appropriate transceiver based on the availability data. The method further includes initializing a communication for the secured application using the appropriate transceiver.

20 Claims, 6 Drawing Sheets

SECURED APPLICATION COMMUNICATIONS

TECHNICAL BACKGROUND

Wireless communication systems typically include wireless access systems with equipment such as wireless access nodes along with various control and routing nodes that provide wireless access to communication services for wireless communication devices over wireless links. A typical wireless communication system includes systems to provide wireless access across a geographic region, with wireless coverage areas associated with individual wireless access nodes. The wireless access systems exchange user communications between wireless communication devices, service providers, and other end user devices. The user communications typically include voice calls, data exchange, web pages, streaming media, or text messages, among other communication services.

In some wireless communication systems, more than one wireless communication network can be employed across a similar geographic region, with each wireless communication network including one or more sectors of wireless coverage. For example, a first wireless network employing a first wireless communication protocol can be deployed along with a second wireless network employing a second wireless communication protocol. Separate wireless access equipment can be deployed for each wireless network, such as when a fourth generation (4G) Long Term Evolution (LTE) wireless network is deployed over a similar geographic area as a third generation (3G) wireless network or other wireless networks.

Many wireless communication devices today contain and communicate highly sensitive information about users and their businesses. This information may include bank codes, usernames and passwords, among other information. To protect this information applications use a variety of techniques to encrypt or otherwise make it more difficult for unwanted persons to view this important data. Such methods include encrypting the data on the device itself, encrypting the communications with the device, among other security measures. The purpose of all of these precautions is to ensure that the personal user information stays private.

Overview

Examples disclosed herein provide systems, methods, hardware, and software for initiating a secured application communication. In one instance, a method for initiating communication on a wireless communication device includes identifying a communication request for a secured application and selecting one or more radio transceivers for the communication request. The method further provides initializing the one or more radio transceivers to search for availability data based on an open operating system command and identifying an appropriate transceiver based on the availability data. The method further includes initiating a communication for the secured application using the appropriate transceiver.

In another example, a computer apparatus to facilitate communications for a secure application includes processing instructions that direct the wireless communication device to identify a communication request for a secured application, select one or more radio transceivers for the communication request, initialize the one or more radio transceivers to search for availability data based on an open operating system command, identify an appropriate transceiver based on the availability data, and initialize a communication for the secured application using the appropriate transceiver. The apparatus further includes one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DETAILED DESCRIPTION

Figure 1:
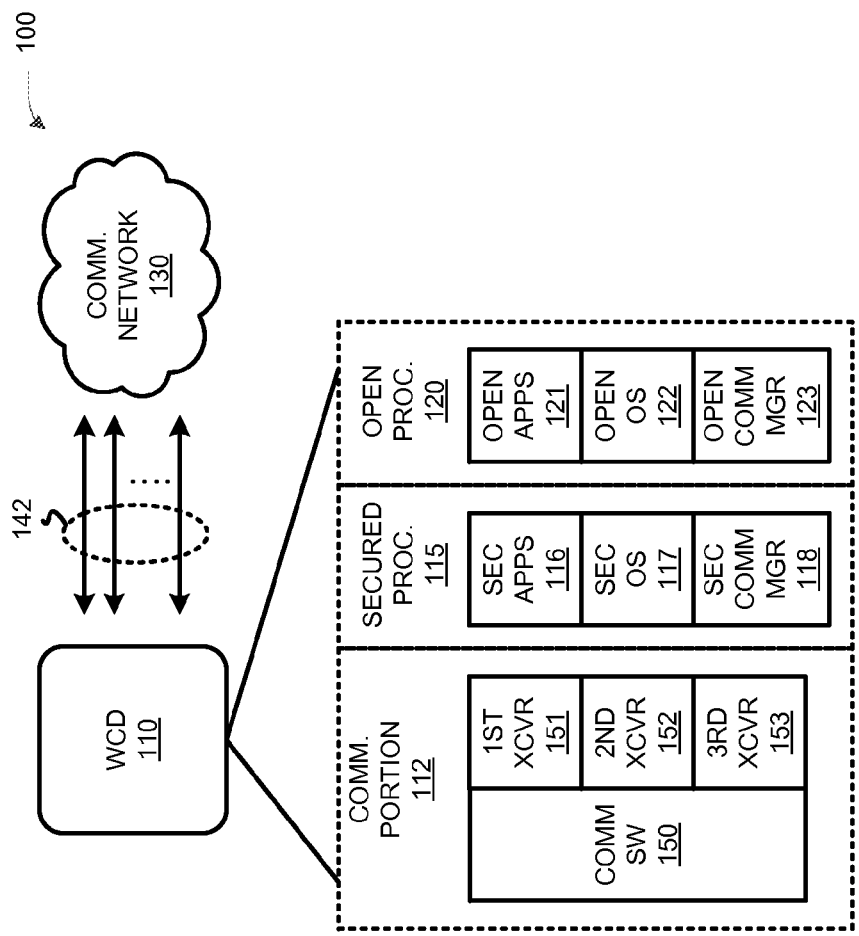
FIG. 1 illustrates a communication system for secured application communication.

FIG. 1 illustrates communication system 100 for secured application communication. Communication system 100 includes wireless communication device (WCD) 110 and communication network 130. WCD 110 communicates with communication network 130 over communication links 142. WCD 110 further includes communication portion 112 communicatively coupled to secured processing portion 115 and open processing portion 120. Communication portion 112 includes communication switch 150 and one or more communication transceivers, namely first transceiver 151, second transceiver 152, and third transceiver 153, although other transceivers may be included in some examples. Each communication transceiver of WCD 110 can communicate over ones of communication links 142.

In operation, WCD 110 may include a variety of applications that are both secured 116 and open 121. Open applications 121 comprise applications that have a lower priority level for security, such as games or other similar applications. Secured applications 116, however, are concerned with data safekeeping and may contain personal information about the user, the users work, or other important information. Secured applications 116 may execute using secured operating system 117 and open applications 121 may execute using open operating system 122. Further, when applications 116 and 121 require an external communication using transceivers 151-153, the applications may call upon secured communication manager 118 and open communication manager 123, respectively.

Figure 2:
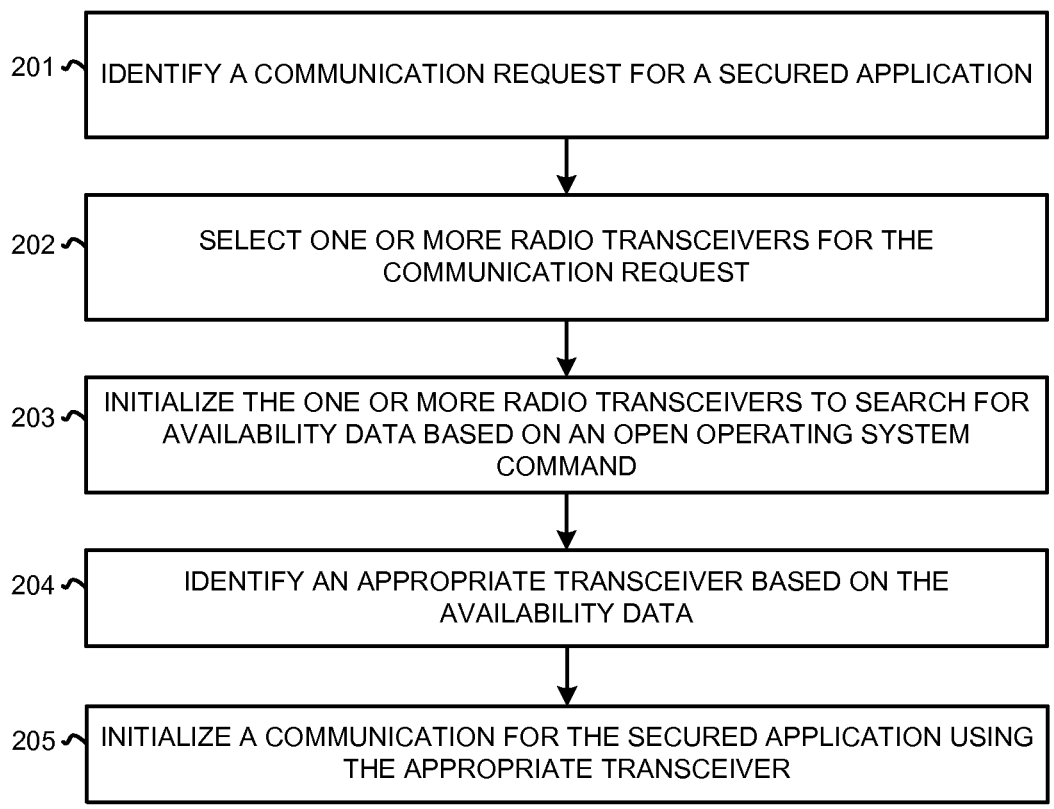
FIG. 2 illustrates a method of operating a wireless communication device for secured application communication.

To better illustrate the operation of WCD 110, FIG. 2 is provided to illustrate a method of initializing a communication for a secured application. The method includes identifying a communication request for a secured application (201). This secured application may include any application that attempts to protect data and communications from and to WCD 110. Some examples of a communication request may include a request to upload data to an external server, a request to communicate with another external device, a request to receive data from an external server, among other communication requests.

Once a communication request has been identified, one or more radio transceivers are selected for the communication request (202). In some examples, the radio transceivers may be selected by the application itself. Thus, the application may prefer to communicate using a specific communication protocol over another, such as wireless fidelity (WIFI) over Long Term Evolution (LTE). In other instances, secured operating system 117 or secured communication manager 118 may identify the one or more radio transceivers for the communication request. These radio selections may be made based on the security required for the communication, the speed necessitated for the communication, among other factors—including combinations thereof.

In some examples, the secured application, the secured operating system, or the secured communication manager may not only select the communication protocol for the receiver, but may also choose a specific frequency within the communication protocols. Thus, instead of simply selecting LTE, a communication request may inquire for a specific frequency or band of frequencies within LTE.

Upon the radio selection, the method provides initializing the one or more radio transceivers to search for availability data based on a command from open operating system 122 (203). Open operating system 122 is configured to command the selected transceivers to scan for signal strength, availability to serve the request of the secured application, possible security concerns, among other availability data. In some examples, the results of the scan are returned to either secured operating system 117 or secured communication manager 118, which will then process the results to identify the appropriate transceiver radio for the communication (204). In other instances, open operating system 122 may determine the appropriate transceiver based on the results of the scan and pass an identifier of the best transceiver to secured operating system 117 or secured communication manager 118.

Following the scan for availability and identifying the appropriate transceiver, the method provides initializing a communication for the secured application using the appropriate transceiver (205). In some occurrences, only the transmitter or the receiver of the transceiver may be required for the secured application. In such an instance, communication switch 150 will allow the application to transmit or receive using the appropriate transceiver of transceivers 151-153, but will separate the remaining transceivers from the communication to ensure security. For example, if a secured banking application was stored with secured applications 116 on WCD 110, and requested to send banking information over WIFI, then the WIFI transceiver would be first scanned for availability. If WIFI was found to be available, then communication switch 150 could connect the application to the WIFI transmitter, and disconnect the WIFI receiver and any other remaining transceivers. The result is that only the banking data will be allowed to transmit using the WIFI transmitter and no other communications will be permitted with the secured banking application. In other examples, the application may request to both transmit and receive data. Thus, communication switch 150 may connect the application to both the transmit and the receive portions of the transceiver to accomplish the applications specific task.

Once attached to the appropriate transceiver, the secured application from secured applications 116 may be the only service allowed to transmit or receive during that time period. This preventative measure of stopping other applications from using the transceiver ensures that the secured communications are not interrupted, modified, or monitored. However, although a transmitter or a receiver may be occupied by secured application, other applications may be allowed to use the other available transceivers. For instance, if a user were using a movie viewing application that required the use of WIFI, the stream of the movie may be unsecured and received through the WIFI receiver to the open portion of the application in open applications 121. Meanwhile, a secured portion of the same application, such as a comments portion, may use the WIFI transmitter. Although this example uses an open and secured portion of the same application, it should be understood that the transmitting application may be entirely different than the receiving application.

Returning to FIG. 1, WCD 110 comprises a processing system (secured processing portion 115 and open processing portion 120), a plurality of transceiver portions 151-153, user interface elements, and other communication elements. The transceiver portions 151-153, which may comprise radio transceivers for wireless communication, typically incorporate amplifiers, filters, modulators, wireless modules, and signal processing circuitry. The transceiver portions can be used to communicate over links 142, which can include wired, optical, or wireless links. The processing system can comprise one or more processing portions secured processing portion 115 and open processing portion 120. WCD 110 can also include user interface systems, memory devices, non-transitory computer-readable storage mediums, software, processing circuitry, or some other communication components. WCD 110 can be a sensor device, user device, subscriber equipment, customer equipment, access terminal, wireless smartphone, computer, mobile Internet appliance, wireless network interface card, media player, game console, or some other communication apparatus, including combinations thereof.

Communication network 130 comprises communication and control systems for providing access to communication services for other devices and networks. Communication network 130 can each provide communication services including communication routing, link bridging, network communications, data exchange, or other communication services. In some examples, communication network 130 is a cellular voice and data network that can provide voice calls, text messages, data access, or other communication services provided over cellular or wireless communication networks. In some examples, communication network 130 includes equipment to provide wireless access to communication services within different coverage areas to user devices, route communications between content providers and user devices, and facilitate handoffs between equipment of different coverage areas, among other operations. Communication network 130 can also comprise elements such as radio access network (RAN) equipment, E-UTRAN Node B equipment, eNodeB equipment, Evolved Node B equipment, Mobility Management Entity (MME) equipment, interworking functions (IWF), Home Subscriber Servers (HSS), Evolved Universal Terrestrial Radio Access (E-UTRA) network equipment, base stations, base transceiver stations (BTS), base station controllers (BSC), mobile switching centers (MSC), home location registers (HLR), radio node controllers (RNC), call processing systems, authentication, authorization and accounting (AAA) equipment, access service network gateways (ASN-GW), packet data switching nodes (PDSN), home agents (HA), mobility access gateways (MAG), Internet access nodes, telephony service nodes, databases, or other communication and control equipment.

Communication links 142 each use metal, glass, optical, air, space, or some other material as the transport media. Communication links 142 can each use various communication protocols, such as Time Division Multiplex (TDM), asynchronous transfer mode (ATM), Internet Protocol (IP), Ethernet, synchronous optical networking (SONET), hybrid fiber-coax (HFC), Universal Serial Bus (USB), circuit-switched, communication signaling, wireless communications, or some other communication format, including combinations, improvements, or variations thereof. Wireless communications may include Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication links 142 can each be a direct link or can include intermediate networks, systems, or devices, and can include a logical network link transported over multiple physical links. Communication links 142 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 3:
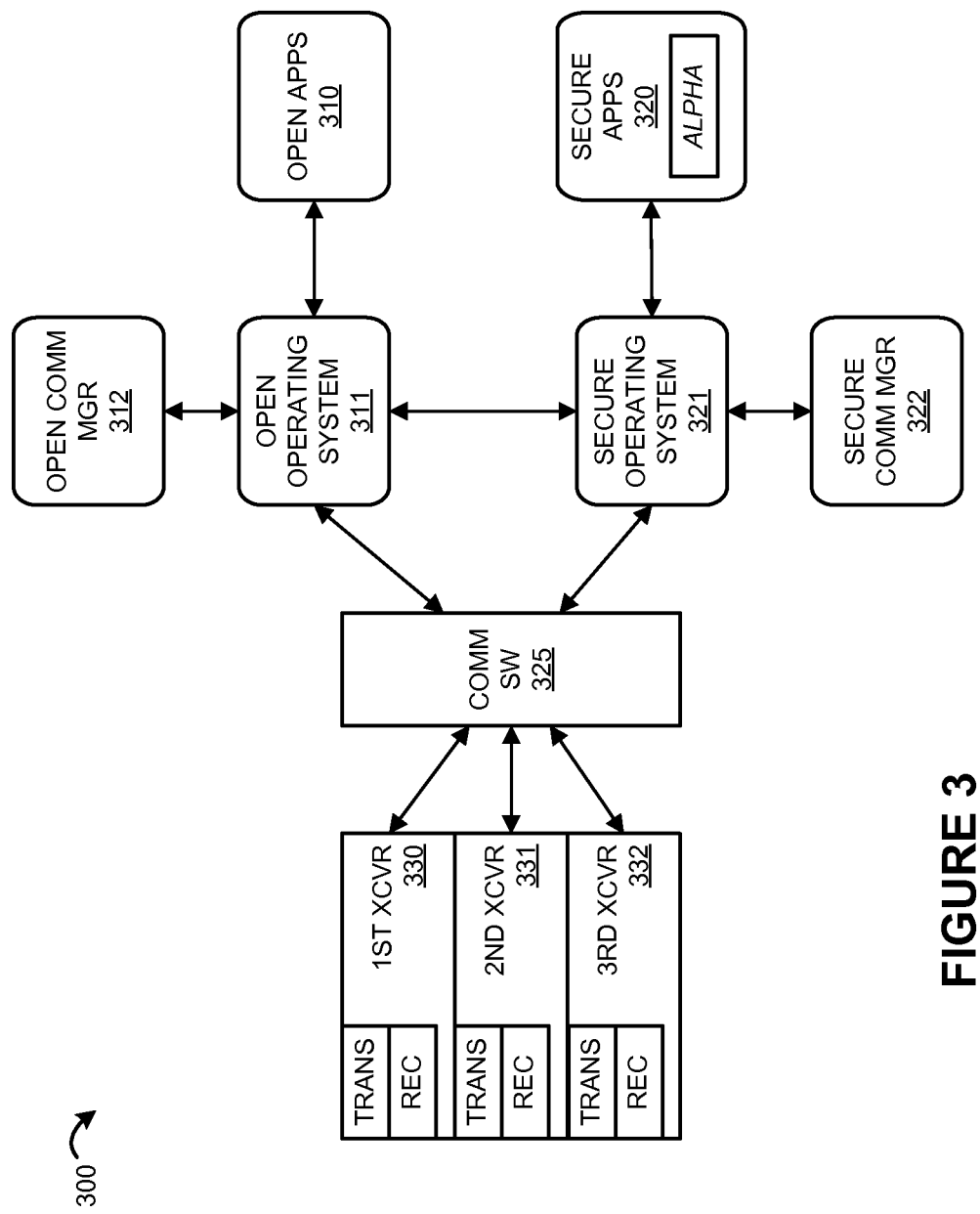
FIG. 3 illustrates a system for initializing communication for a secure application.

Referring now to FIG. 3, FIG. 3 illustrates a system 300 for initializing communication for secure application. System 300 represents wireless communication device 110, although other examples exist. System 300 includes open applications 310, open operating system 311, open communication manager 312, secure applications 320, secure operating system 321, secure communication manager 322, communication switch 325, and radio transceivers 330-332. In a particular example, transceivers 330-332 may communicate using WIFI, LTE, and CDMA, respectively, although transceivers 330-332 may communicate using any communication format.

In operation, a secure application, such as application "Alpha" in secure applications 320 may require a communication with a communication network. This communication may include a request for data, a transfer of data to another wireless device, a receipt of data, or some other communication. Once a request is recognized, there must be a selection of a transceiver to handle the request. In some examples, the secure application that is making the request will identify the appropriate transceivers to handle the request. In other examples, secure operating system 321 or secure communication manager 322 may identify the possible transceivers to handle the request.

Once the transceivers have been identified, open operating system 311 will command the identified transceivers to gather availability data. Availability data may include a variety of factors including signal strength for the transceiver, any security concerns for the transceiver, available networks, among other availability factors. Following the availability scan by the transceivers, the data received will then be processed to determine if a transceiver is available to accomplish the communication. In some examples, the availability data may be passed to either secure operating system 321 or secure communication manager 322 to determine the appropriate transceiver for the communication. Secure operating system 321 or secure communication manager 322 may weigh all of the availability factors to determine the suitable transceiver of transceivers 330-332 to handle the communication request. In other instances, the weighing of the availability data may be accomplished within operating system 311. Thus, the appropriate transceiver will be identified by open operating system 311 and passed to secure operating system 321 and communication manager 322.

Following the identification of the appropriate transceiver of transceivers 330-332, the secure application, such as application "Alpha," may begin communicating using the identified transceiver. During this process the transceivers that were not selected will be disconnected such that no other communication will be allowed with the secure application. In some examples, the secure application may only need to use the transmitter or the receiver of a transceiver. In such cases, either the transmitter or the receiver that is not being used may be disconnected such that the secured application is only connected to either the transmitter or the receiver.

Although the secured application is the sole user of the identified communication path during a communication, other applications including open applications 310 and secure application 320 may require a communication. During such instances, communication switch 325 may direct other applications to any of the available transceivers that are not in use by the secure application. For example, if the secure application was using the transmitter of third transceiver 332, then the other applications could use the receiver of third transceiver 332 or transceivers 330-331.

Figure 4:
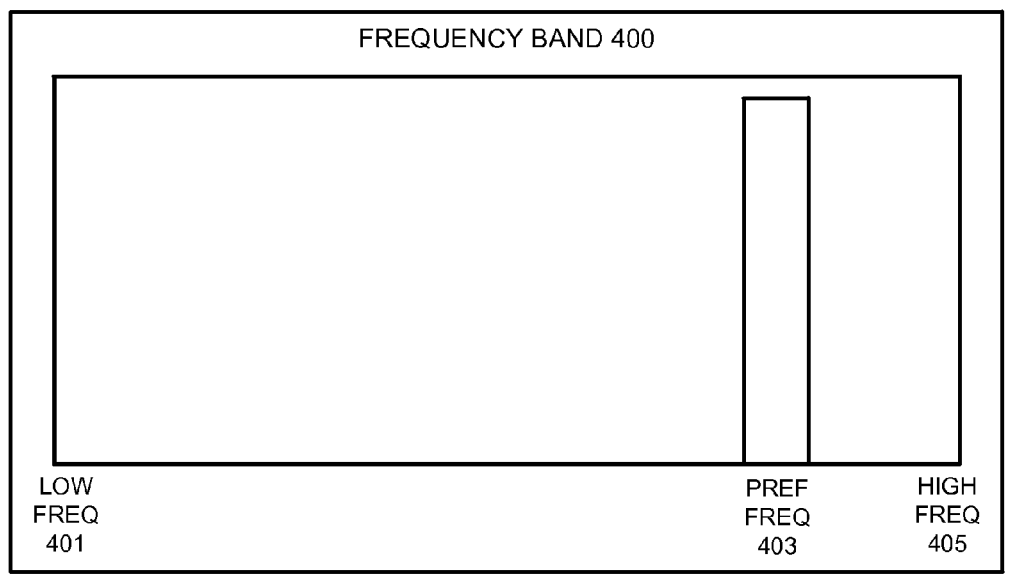
FIG. 4 illustrates a frequency band for secured communication.

FIG. 4 illustrates a frequency band 400 according to one example. Frequency band 400 represents the frequency band for a communication protocol such as LTE or some other frequency band. Frequency band 400 includes low frequency limit 401, high frequency limit 405, and preferred frequency range 403. In operation, a secure application on a wireless communication device may require a wireless communication. During this process, the application itself, the secured operating system, or a secure communication manager may prefer that the communication take place in a specific band of a wireless communication protocol, such as preferred frequency range 403. Upon this designation, an open operating system on the wireless communication device may command the preferred transceiver to test the availability of preferred frequency range 403. If preferred frequency range 403 is found to be available then the communication from the secured application can be processed using the frequency range. If, however, preferred frequency range 403 is found to be unavailable, the communication may either be abandoned in some examples, or move to a back up frequency or communication protocol.

Figure 5:
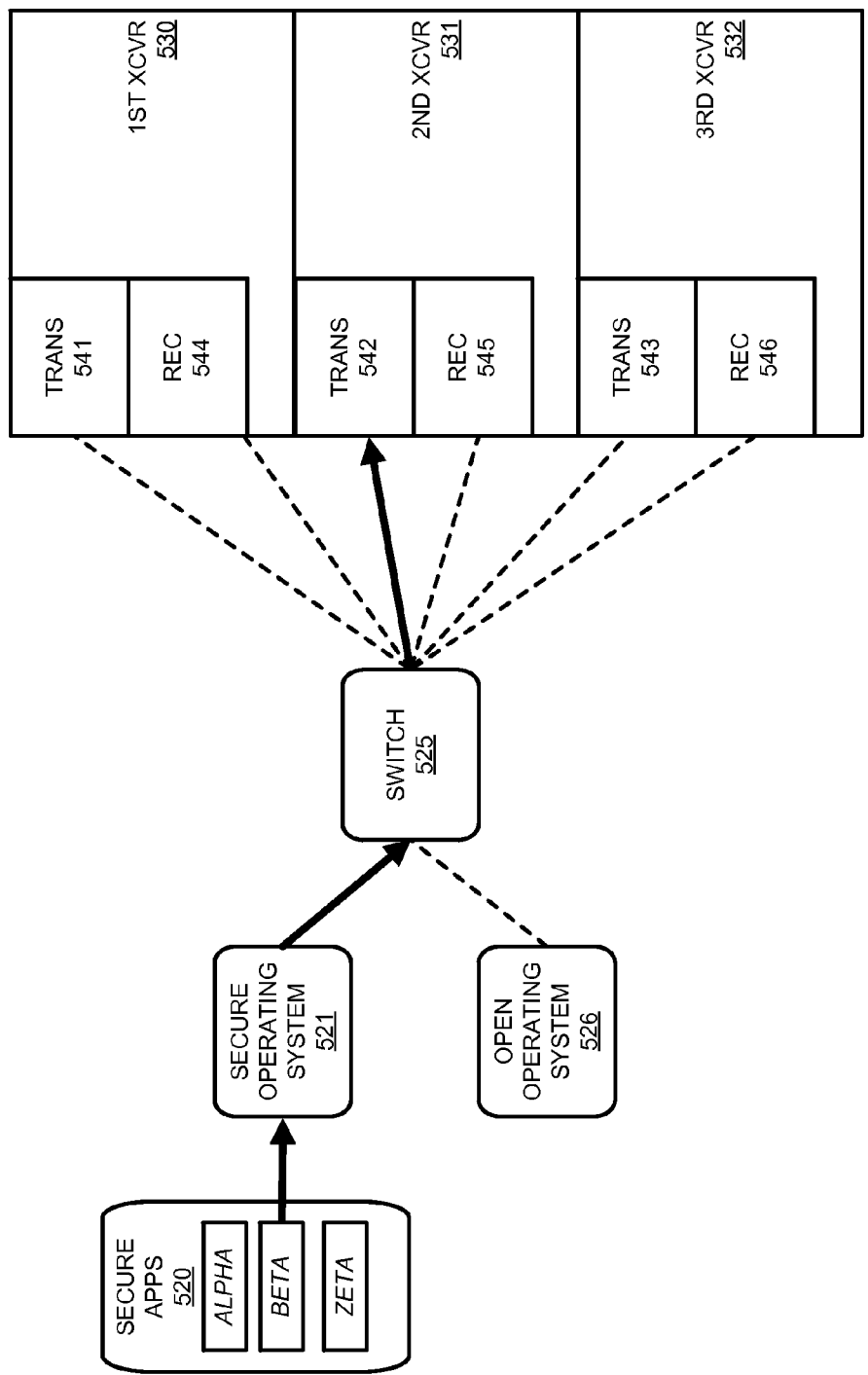
FIG. 5 illustrates an overview of initializing a secured communication.

FIG. 5 illustrates the linking of a secured application to an appropriate transceiver. FIG. 5 includes secure applications 520, secure operating system 521, switch 525, open operating system 526 and radio transceivers 530-532. Transceivers 530-532 further include transmitters 541-543 and receivers 544-546. In linking the appropriate transceiver of transceivers 530-531, an application from secured applications 520 may require a communication. Upon the recognition of a communication request, open operating system 526 may command requested transceivers to scan for availability. Following the identification of an appropriate transceiver based on the scan, the communication for the application can be connected to the appropriate transceiver via switch 525.

In the present example, application "Beta" in secured applications 520 is requesting to transmit data. Upon the request, the appropriate transmitter within transceivers 530-532 will be determined via scan data from requested transceivers for the application. Here, analyzing the scan data, transmitter 542 has been chosen to handle the transmission request. As a result, the data that needs to be transferred for application "Beta" will pass through secure operating system 521 to switch 525 and finally to transmitter 542 for transmission.

Once connected with transmitter 542, application "Beta" may be segregated from any other transceiver as well as any other applications. Thus, application "Beta" may have a direct path to transmitter 542 without the possibility of interruptions or other interferences with transmission. In some examples, other applications may require a communication at the same time as the secured application. In such instances, the application may use first transceiver 530, third transceiver 532, or, in some cases receiver 545. However, the other applications may not use transmitter 542 while the secured application is transmitting.

Figure 6:
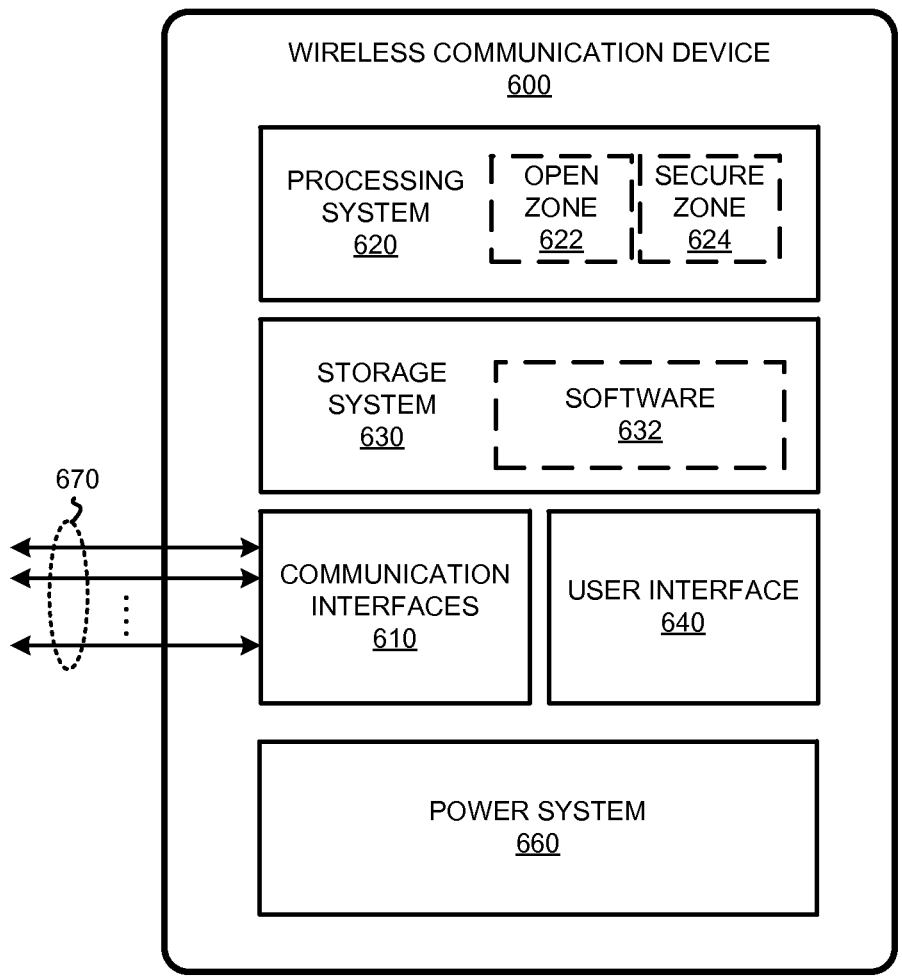
FIG. 6 illustrates a wireless communication device.

FIG. 6 illustrates a wireless communication device 600 for secured application communications. Wireless communication device 600 is an example of wireless communication device 110 although other examples are possible. Wireless communication device 600 includes communication interfaces 610, processing system 620, storage system 630, user interface 640, and power system 660.

Communication interface 610, processing system 620, storage system 630, user interface system 640, and power system 660 are communicatively coupled, and can communicate over associated discrete links, common busses, data links, power links, RF links, or other links. Wireless communication device 600 can be distributed or consolidated among equipment or circuitry that together forms the elements of wireless communication device 600. Wireless communication device 600 can optionally include additional devices, features, or functionality not discussed here for purposes of brevity.

Communication interface 610 comprises one or more communication transceiver circuitry portions and communication interface circuitry for communicating over one or more communication links 670 with one or more communication networks. In some examples, communication interface 610 includes wireless transceiver circuitry and antennas for communicating with base stations of a cellular voice and data network, among other communication networks. Communication interface 610 could include radio transceiver equipment and antenna elements for wirelessly exchanging user communications and overhead communications over the associated ones of links 670, among further links. Links 670 could each use various protocols or communication formats as described herein for links 142, including combinations, variations, or improvements thereof.

Processing system 620 can comprise one or more microprocessors and other circuitry that retrieves and executes software 632 from storage system 630. Processing system 620 can be implemented within a single processing device but can also be distributed across multiple processing devices or sub-systems that cooperate in executing program instructions. Examples of processing system 620 include general purpose central processing units, application specific processors, system-on-a-chip devices, and logic devices, as well as any other type of processing device, combinations, or variations thereof.

In this example, processing system 620 includes open zone 622 and secure zone 624. Each zone of processing system 620 can be implemented in a separate microprocessor, microprocessor core, virtual core, or other hardware or software partition that separates memory spaces, operating systems, drivers, and other operational hardware and software elements so as to provide a restricted level of access for applications and users to secure zone 624, and a non-restricted level of access for open zone 622. Likewise, secure zone 624 comprises in some examples, a secure core or "trust zone" core of a processor system that prevents access to the processing and memory elements of secure zone 624 unless authorized.

Storage system 630 can comprise any computer readable storage media or storage device readable by processing system 620 and capable of storing software 632. Software 632 may contain both secure applications as well as open applications within storage system 630. Storage system 630 can include volatile and nonvolatile, removable and non-removable media implemented in any method or technology for storage of information, such as computer readable instructions, data structures, program modules, or other data. In addition to storage media, in some implementations storage system 630 can also include communication media over which software 632 or other data can be communicated. Storage system 630 can be implemented as a single storage device but can also be implemented across multiple storage devices or sub-systems co-located or distributed relative to each other. Storage system 630 can comprise additional elements, such as a controller, capable of communicating with processing system 620. Examples of storage media include random access memory, read only memory, magnetic disks, optical disks, flash memory, virtual memory and non-virtual memory, magnetic cassettes, magnetic tape, magnetic disk storage or other magnetic storage devices, or any other medium which can be used to store the desired information and that can be accessed by an instruction execution system, as well as any combination or variation thereof, or any other type of storage media. In no case is the storage media a propagated signal.

In operation, software 632 directs wireless communication device 600 to operate as described herein. In a particular example, software 632 will identify a communication request for a secure application. Such a communication request may comprise a transmit request, a receive request, or both a transmit and a receive request. Upon the identification of a communication request, software 632 will select one or more radio transceivers for the communication request. The selecting of the radio transceivers may be done by the secured application itself, or by secured zone 624. Once selected, an operating system executing within open zone 624 will command the transceivers to scan for availability data. This availability data may include determining if the transceivers network is available, the signal strength of the network, any security concerns, among other considerations. In some examples, the availability data from the scan is passed to secure zone 624 for a determination of the appropriate transceiver. However, in other instances, the availability data may be processed by open zone 622 to establish the appropriate transceiver.

Following the identification of the appropriate transceiver, software 632 initiates communication using the identified transceiver. In some instances, the secured application communication is the only communication allowed from the transceiver during the communication. Thus, if the communication used the transmitter an LTE transceiver, then no other communication could use that transmitter during that process. However, other communications may use any of the other available transmitters or receivers during the secured communication. Using the example above, if the a secured communication is using the transmitter for LTE, then another communication may use the receiver for LTE or any of the other transceiver on wireless communication device 600.

User interface system 640 includes equipment and circuitry for receiving user input and control, such as for engaging in voice calls or data sessions, and receiving user instructions for text or video messages, among other operations.

Examples of the equipment and circuitry for receiving user input and control include push buttons, touch screens, selection knobs, dials, switches, actuators, keys, keyboards, pointer devices, microphones, transducers, potentiometers, non-contact sensing circuitry, accelerometers, global positioning systems, or other human-interface equipment. User interface system 640 also includes equipment to communicate information to a user of wireless communication device 600. Examples of the equipment to communicate information to the user could include displays, indicator lights, lamps, light-emitting diodes, haptic feedback devices, audible signal transducers, speakers, buzzers, alarms, vibration devices, or other indicator equipment, including combinations thereof.

Power system 660 includes circuitry and a power source to provide power to the elements of wireless communication device 600. The power source could include a battery, solar cell, flywheel, capacitor, thermoelectric generator, chemical power source, dynamo, or other power source. In some examples, power system 660 receives power from an external source, such as a wall outlet or power adapter. Power system 660 also includes circuitry to condition, monitor, and distribute electrical power to the elements of wireless communication device 600.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of providing secure application communications on a wireless communication device, the method comprising:
    identifying a communication request for a secured application on the wireless communication device, wherein the wireless communication device comprises a secured processing system portion and an open processing system portion and wherein the secured application comprises an application executable by the secured processing system portion;
    selecting one or more radio transceivers for the communication request from a plurality of radio transceivers on the wireless communication device based on preferences from the secured processing system portion;
    initializing the one or more radio transceivers to search for availability data based on an open operating system command from an open operating system executable by the open processing system portion;
    identifying an appropriate transceiver based on the availability data; and
    wirelessly communicating data for the secured application using the appropriate transceiver,
    wherein the open processing system portion and the secured processing system portion each comprise at least one processing core.

2. The method of claim 1 wherein the one or more radio transceivers communicate using one or more wireless communication formats.

3. The method of claim 1 wherein selecting one or more radio transceivers for the communication request based on the preferences from the secured processing system portion comprises identifying one or more preferred radio transceivers from the secured application.

4. The method of claim 1 wherein selecting one or more radio transceivers for the communication request based on the preferences from the secured processing system portion comprises identifying one or more preferred radio transceivers from a secured operating system, wherein the secured operating system comprises an operating system executable by the secured processing system portion.

5. The method of claim 1 wherein selecting one or more radio transceivers for the communication request based on the preferences from the secured processing system portion comprises identifying one or more preferred radio transceivers from a secured communication manager, wherein the secured communication manager comprises a communication manager executable by the secured processing system portion.

6. The method of claim 1 wherein the communication request comprises a transmit request for the secured application.

7. The method of claim 1 wherein the communication request comprises a receive request for the secured application.

8. The method of claim 1 further comprising:
    separating the communication for the secured application from other wireless data communications of the wireless communication device.

9. The method of claim 1 wherein identifying the appropriate transceiver based on the availability data comprises:
    processing the availability data in a secured communication manager to determine the appropriate transceiver.

10. The method of claim 1 further comprising:
    initializing a second communication for another application using a transmitter or a receiver not in use for the communication for the secured application.

11. The method of claim 1 wherein selecting the one or more radio transceivers for the communication request comprises selecting a specific frequency band for a transceiver.

12. A computer apparatus to facilitate communications for a secure application on a wireless communication device, the computer apparatus comprising:
    processing instructions that direct the wireless communication device, when executed by the wireless communication device, to identify a communication request for a secured application, select one or more radio transceivers for the communication request from a plurality of radio transceivers on the wireless communication device based on preferences from a secured processing system portion, wherein the wireless communication device comprises the secured processing system portion and an open processing system portion and wherein the secured application comprises an application executable by the secured processing system portion, initialize the one or more radio transceivers to search for availability data based on an open operating system command from an open operating system executable by the open processing system portion, identify an appropriate transceiver based on the availability data, and wirelessly communicate data for the secured application using the appropriate transceiver; and
    one or more non-transitory computer readable media that store the processing instructions.

13. The computer apparatus of claim 12 wherein the processing instructions direct the wireless communication device to select one or more radio transceivers for the communication request and to select the one or more radio transceivers from at least a Long Term Evaluation radio, a third generation radio, and a wireless fidelity radio.

14. The computer apparatus of claim 12 wherein the processing instructions direct the wireless communication device to select the one or more radio transceivers for the communication request based on preferences from the secured processing system portion and identify one or more preferred radio transceivers from the secured application.

15. The computer apparatus of claim 12 wherein the processing instructions direct the wireless communication device to select the one or more radio transceivers for the communication request based on preferences from the secured processing system portion and identify one or more preferred radio transceivers from a secured operating system, wherein the secured operating system comprises an operating system executable by the secured processing system portion.

16. The computer apparatus of claim 12 wherein the processing instructions direct the wireless communication device to select the one or more radio transceivers for the communication request based on preferences from the secured processing system portion and identify one or more preferred radio transceivers from a secured communication manager wherein the secured communication manager comprises a communication manager executable by the secured processing system portion.

17. The computer apparatus of claim 12 wherein the communication request comprises a transmit request for the secured application.

18. The computer apparatus of claim 12 wherein the communication request comprises a receive request for the secured application.

19. The computer apparatus of claim 12 wherein the processing instructions further direct the wireless communication device to separate the communication for the secured application from other wireless data communications of the wireless communication device.

20. The computer apparatus of claim 12 wherein the processing instructions direct the wireless communication device to select the one or more radio transceivers for the communication request and to select a specific frequency band for one of the transceivers.

* * * * *